(12) United States Patent  
Gifford, Sr.

(10) Patent No.: US 7,611,104 B1  
(45) Date of Patent: Nov. 3, 2009

(54) STAND FOR SUPPORTING AN OBJECT

(76) Inventor: Robert Wayne Gifford, Sr., 1411 Kittanning Pike, Karns City, PA (US) 16041

( * ) Notice: Subject to any disclaimer, the term of this patent is extended or adjusted under 35 U.S.C. 154(b) by 185 days.

(21) Appl. No.: 11/698,920

(22) Filed: Jan. 29, 2007

(51) Int. Cl.  
*F16M 11/04* (2006.01)

(52) U.S. Cl. .................................................. 248/176.3

(58) Field of Classification Search ............... 248/125.8, 248/125.9, 676, 161  
See application file for complete search history.

(56) References Cited

U.S. PATENT DOCUMENTS

| | | | |
|---|---|---|---|
| 3,856,253 A | 12/1974 | Seebinger | |
| 3,930,645 A * | 1/1976 | Anderson | 269/289 R |
| 4,113,221 A | 9/1978 | Wehner | |
| 4,317,553 A * | 3/1982 | Meinunger | 248/171 |
| 4,596,484 A * | 6/1986 | Nakatani | 403/104 |
| 5,395,178 A * | 3/1995 | Chvojcsek | 403/349 |
| 5,421,549 A * | 6/1995 | Richards | 248/163.2 |
| 6,523,799 B2 | 2/2003 | Su | |
| 6,663,060 B1 * | 12/2003 | Gifford, Sr. | 248/161 |
| 7,040,591 B1 * | 5/2006 | Simon | 248/458 |
| 2005/0056739 A1 * | 3/2005 | Koning et al. | 248/171 |

* cited by examiner

*Primary Examiner*—J. Allen Shriver, II  
*Assistant Examiner*—Erin Smith  
(74) *Attorney, Agent, or Firm*—Aileen Champion Addessi

(57) ABSTRACT

A stand for supporting an object includes at least one support attachable to the object and a sliding member slidably secured to the support. The stand also includes a plurality of legs pivotally coupled to the sliding member for allowing the plurality of legs to move with the sliding member when the sliding member slides along the support. A retainer is coupled to the plurality of legs for stabilizing and supporting the plurality of legs. A release mechanism is attached to the sliding member for controlling movement of the sliding member to pivot the plurality of legs into an outward expanded position during use of the stand and to pivot the plurality of legs into an inward collapsed positioned during non-use of the stand.

19 Claims, 2 Drawing Sheets

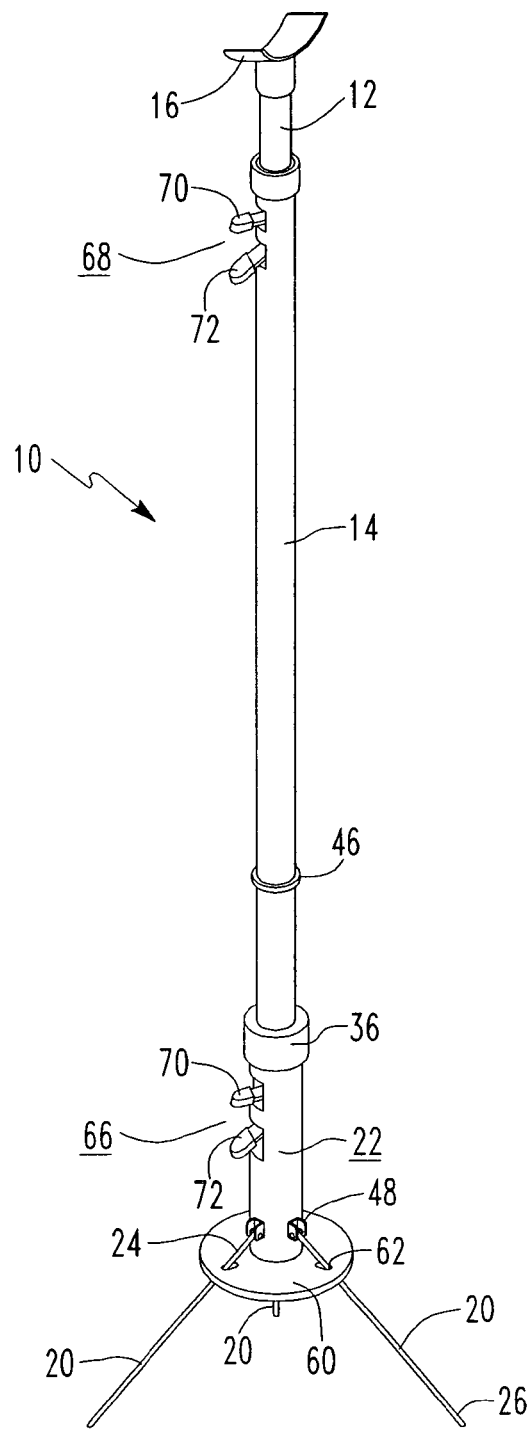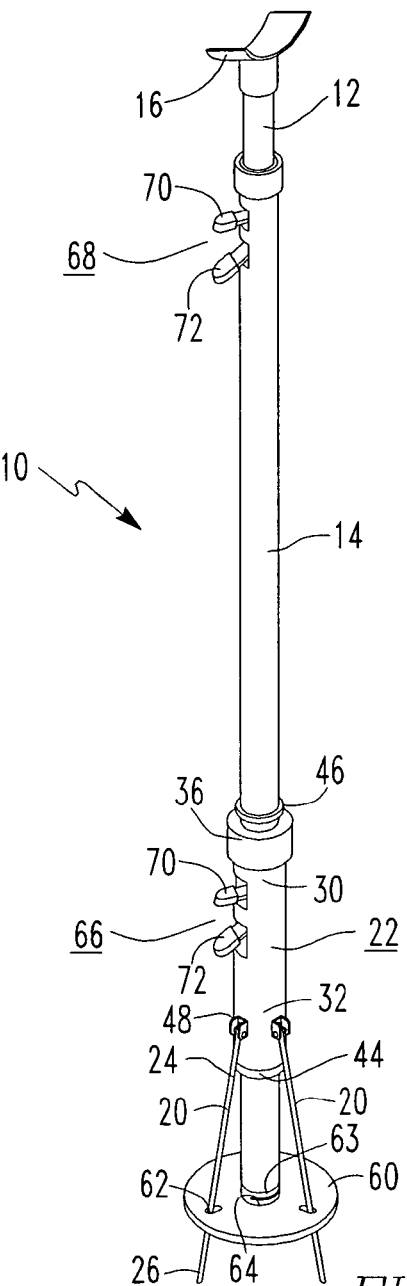
FIG.1
FIG.2

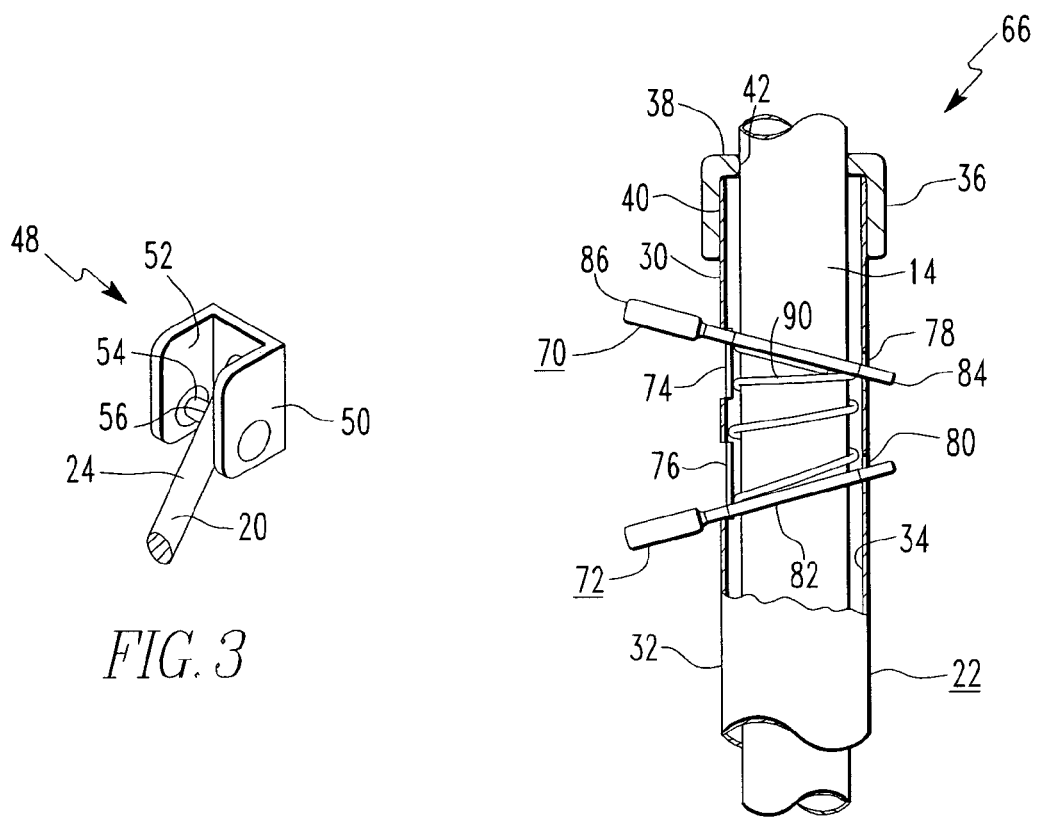
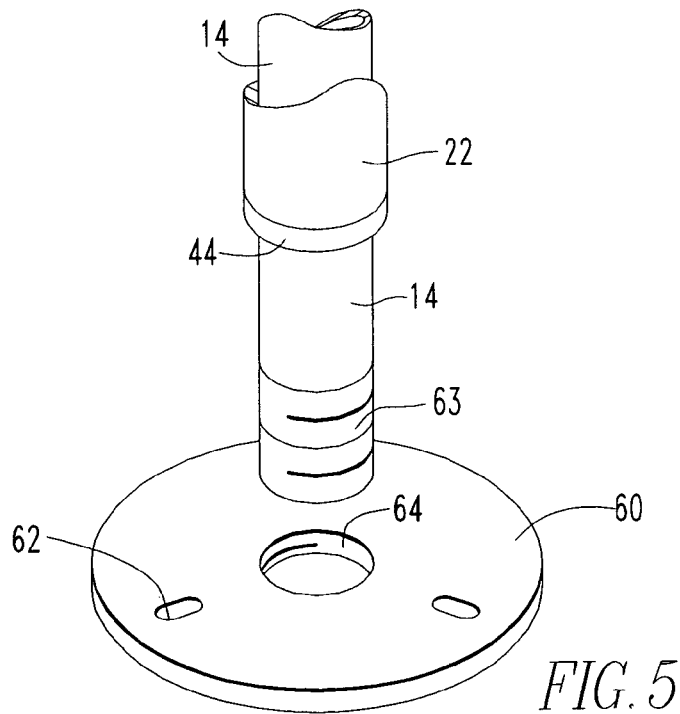
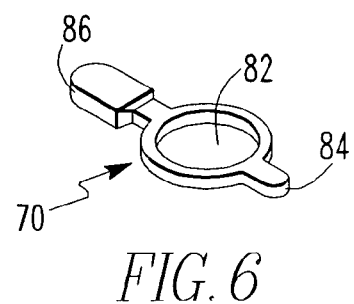
FIG. 3
FIG. 4
FIG. 5
FIG. 6

STAND FOR SUPPORTING AN OBJECT

BACKGROUND OF THE INVENTION

The invention relates to structures on or in which something may be placed for support and, more particularly, to a stand which may be collapsed for transportation and storage.

Stands are commonly used by musicians who are singing and/or playing musical instruments, by people speaking in front of a crowd, in various types of ceremonies, by children who are playing, etc. Often the stand must be transported to a different location or be stored during non-use. A bulky cumbersome stand takes up space and is awkward to handle and carry.

Currently, stands are used which have solid bases. These stands usually cannot be folded or collapsed. Other stands that have foldable bases may be awkward to fold, require two hands to fold the unit together, and are often flimsy.

U.S. Pat. No. 6,663,060 to Gifford discloses a stand with a solid base. U.S. Pat. No. 4,113,221 to Wehner discloses a chair with a plurality of legs for supporting a person. U.S. Pat. Nos. 6,523,799 and 3,856,253 disclose stands having adjustable heights. However, none of these stands have a foldable base.

Therefore, what is needed is an apparatus for holding an object that is stable and which may be easily and quickly folded or collapsed for storage or transportation.

SUMMARY OF THE INVENTION

A stand for supporting an object includes a support attachable to the object, a sliding member slidably secured to the support, a plurality of legs coupled to the sliding member for allowing the plurality of legs to move with the sliding member when the sliding member slides along the support, and a release mechanism attached to the sliding member for controlling movement of the sliding member to pivot the plurality of legs into an outward expanded position during use of the stand and to pivot the plurality of legs into an inward collapsed positioned during non-use of the stand. The stand also includes a retainer coupled to the support having a plurality of holes for insertion of the plurality of legs.

The stand may comprise the support including a first support member and a second support member telescopically attached together. A second release mechanism may be attached to the second support for controlling movement of the first and second supports. A stop may be secured to the support for preventing movement of the sliding member. A collar may be coupled to the support and may have a hole for insertion of the support and a shoulder for covering the gap between the support and the sliding member.

The pivotal coupling of the plurality of legs to the sliding member may include a plurality of brackets attached to the sliding member and having one of the plurality of brackets attached to each of the plurality of legs, and a plurality of pivot pins having one of the plurality of pivot pins positioned within each of the plurality of brackets and having one of the plurality of pivot pins attached to each of the plurality of legs for allowing each leg to pivot about one pivot pin.

The release mechanism comprises at least one release pin positioned within the bore of the sliding member and having an aperture therethrough, the support slidable within the aperture of the release pin during movement of the sliding member and the support, the at least one release pin positioned at an angle within the sliding member and the support during a resting position of the at least one release pin so that the at least one release pin exerts force onto the support for preventing the support from moving within the sliding member, and a spring disposed within the bore of the sliding member and positioned adjacent to the at least one release pin, manipulation of the at least one release pin enables slidable movement of the support through the spring and through the aperture of the at least one release pin for adjusting positioning of the plurality of legs.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is a perspective view of a stand for supporting an object that is in an open position;

FIG. 2 is a perspective view of the stand in a closed position;

FIG. 3 is a view of a pivotal attachment of a leg to a bracket;

FIG. 4 is a view illustrating internal components of a release mechanism of the stand;

FIG. 5 is a perspective view of a threaded connection of a support and a retainer; and FIG. 6 is a perspective view of a release pin.

DESCRIPTION OF THE PREFERRED EMBODIMENT

The invention described herein provides an apparatus for supporting an object that may be collapsed for storage and/or transportation. Referring to FIGS. 1-6, a stand 10 may be used for supporting an object (not shown), such as a microphone, a music stand, a drum, a lectern, or any other type of object. The stand 10 is also adjustable for altering the position of the object with respect to the height of the person using the stand 10.

The stand 10 includes a support capable of supporting an object in spaced apart relationship to a ground surface. The support may include a single support having a first end portion attached to the object and a second opposite end portion coupled to a sliding member and base.

Alternatively, and as illustrated in FIGS. 1 and 2, the support includes a first support 12 and a second support 14 which are telescopically attached together. The first and second supports 12 and 14 may be elongated cylindrical shafts, may be hollow, solid, or combinations thereof, may be any geometric shape, but still mateable with one another, or may be any other suitable type of support members.

The object is securable to a first end of the first support 12, for example by a support bracket 16 or any other type of bracket. A second end of the first support 12 is disposed within a first end of the second support 14 for telescopically joining together the first and second supports 12 and 14.

The second support 14 is secured to a base assembly, which rests on a ground surface. The base assembly includes a plurality of legs 20 pivotally attached to a sliding member 22. Each leg 20 is an elongated piece of material having a first end 24 and a second end 26. The first end 24 is attached to the sliding member 22 and the second end 26 rests on the ground. Preferably, the base assembly includes three legs 20, but may include any suitable number of legs 20.

The sliding member 22 is movable along a second end of the second support 14 of the stand 10. As one example, the sliding member 22 may be a tubular piece of material having a first end 30 and a second end 32. The sliding member 22 has a bore 34 with an inside diameter corresponding to an outside diameter of the second support 14 for enabling the sliding member 22 to slide about the second support 14.

A collar 36 is attached at the first end 30 of the sliding member 22 for closing a gap between an outside diameter of the second support 14 and an inside diameter of the sliding member 22. As an example, the collar 36 may have a shoulder 38 for covering the gap, a threaded portion 40 mateably engagable with a threaded portion of the sliding member 22, and a hole 42 therethrough for insertion of the second support 14. As an alternative to the threaded connection, the collar 36 may be merely positioned on the second support 14 or may be attached by other means.

A washer 44 or second collar is attached at the second end 32 of the sliding member 22 for closing a gap between an outside diameter of the second support 14 and an inside diameter of the sliding member 22. The washer 44 may be welded to the sliding member or attached by any other suitable means. The washer 44 and collar 36 prevent the second support 14 from wobbling within the sliding member 22, thereby preventing the second support 14 from binding sideways while sliding The washer 44 may be mechanically attached, welded, adhesively attached, or the like to the sliding member 22. The washer 44 may have an outside diameter approximately equal to the outside diameter of the sliding member 22, as illustrated in FIG. 5 for positioning the washer 44 adjacent to an edge of the sliding member, or alternatively, may have an outside diameter approximately equal to the inside diameter of the sliding member 22 for positioning the washer 44 within the sliding member 14.

The collar 36 may contact a stop 46 secured to the second support 14 as the sliding member 22 moves along the second member 14. The stop 46 restricts the amount of movement of the sliding member 22.

The pivotal attachment of the base assembly to the second support 14 may include a bracket 48 attached to the second end 32 of the sliding member 22. As one example, a separate bracket 48 may be attached to each of the three legs 20 and may include a first side wall 50 and a second side wall 52, with a pivot pin 54 supported therebetween. For this example, the leg 20 has a bore 56 therethrough for insertion of the pivot pin 54 allowing the leg 20 to rotate about the pin 54 for enabling the leg 20 to pivot. Alternatively, the bracket 48 may be a single piece of material connecting all of the legs to the sliding member 22, or be any other suitable type of connecting mechanism for pivotally connecting the legs 20 to the sliding member 22.

The stand 10 further includes a retainer 60. The retainer 60 has a plurality of holes 62 corresponding to the dimensions of the legs 20 for disposing one leg 20 through each of the holes 62 of the retainer 60. Preferably, the holes 62 are elongated slots for allowing the legs 20 to angularly slide through the slots 62.

The retainer 60 is secured to the second support 14, such as by mechanical fixtures, by welding, by an adhesive, may be threaded or screwed, or may be secured by any other suitable means. The retainer 60 may be solid piece of material, such as a circular plate, may be a hollow piece of material, may be a piece of material with recesses or hollowed portions, and may have any suitable size and shape.

Referring to FIG. 5, as one example of a mechanical attachment, the second support 14 may have an outside diameter threaded portion 63 and the retainer 60 may have an inside diameter threaded hole 64 for threadedly securing the two pieces together.

Alternatively, as another example of a mechanical attachment, the retainer 60 may have a recessed or countersunk hole for enabling the second support 14 to be inserted only partially through a center hole of the retainer 60 and rest against a flanged area of the countersunk hole for preventing the second support 14 from passing through the center hole of the retainer 60. The retainer 60 may be attached to the second support 14 by a fastener, such as a screw, bolt, by welding, threadedly, or the like.

The sliding member 22 further includes a release mechanism 66. The release mechanism 66 controls movement of the sliding member 22 with respect to the second support 14 and holds the sliding member 22 in a desired position. Activation of the release mechanism 66 allows the sliding member 22 to slide toward and away from the stop 46 to collapse and expand the legs 20 of the base assembly.

An additional release mechanism 68 is coupled to the first and second supports 12 and 14. Activation of this release mechanism 68 allows the first and second supports 12 and 14 to telescopically move with respect to one another for adjusting the overall height of the stand 10.

Both of the release mechanisms 66 and 68 function similarly and have similar components. Although FIG. 4 is a view of release mechanism 66, this figure can also be used for illustrative purposes for release mechanism 68.

Both of the release mechanisms 66 and 68 include a first release pin 70 and a second release pin 72 which are coupled to the second support 14. FIG. 6 is representative of both the first and second release pins 70 and 72. The first and second release pins 70 and 72 are positionable within a first slot 74 and a second slot 76, respectively. Each of the first and second slots 74 and 76 have an upper surface and a lower surface. The first pin 70 has a resting position near the upper surface and is movable toward lower surface. The second pin 72 has a resting position near the lower surface and is movable toward the upper surface.

A first hole 78 and a second hole 80 are disposed through the sliding member 22 for the first release mechanism 66, and through the second support 14 for the second or additional release mechanism 68. The positioning of the first and second holes 78 and 80 holds the pins 70 and 72 at an angle while the pins 70 and 72 are disposed within the second support 14 and the sliding member 22. Each of the pins 70 and 72 has an aperture 82 therethrough which is sized for insertion of either the first support 12 or second support 14. The pins 70 and 72 in the sliding member 22 are disposed through a bore in the sliding member 22 and about the second support 14, and the pins 70 and 72 in the second support 14 are disposed through a bore in the second support 14 and about the first support 12.

Each pin 70 or 72 has a protuberance 84 which is sized for insertion into one of the first and second holes 78 or 80. Each of the pins 70 and 72 has a grip extension 86 for extending through one of the first and second slots 74 and 76 for enabling a person to grasp the grip extension 86 to manipulate the pins 70 and 72. For the first release mechanism 66, a spring 90 is positioned within the bore of the sliding member 22 and between the first and second pins 70 and 72. The second support 14 slides within a central portion of the spring 90 for enabling the spring 90 to be positioned between the sliding member 22 and the second support 14. For the second release mechanism 68, the spring 90 is positioned within the bore of the second support 14 and between the first and second pins 70 and 72. The spring 90 also includes a central portion sized for enabling the first support 12 to be disposed therethrough, thereby positioning the spring 90 between the first and second supports 12 and 14.

In operation, to open the base assembly, the first and second pins 70 and 72 of the release mechanism 66 positioned in the sliding member 22 are squeezed together to release the release mechanism 66 allowing the sliding member 22 to move. Movement of the sliding member 22 away from the stop 46 and toward the retainer 60 allows the legs 20 to expand in an outward direction. During the expansion, the legs 20 may pivot and slide within the holes 62 or slots of the retainer 60 into an open, expanded position for enabling the legs 20 to support the stand 10. The retainer 60 is now positioned adjacent to the sliding member 22, as shown in FIG. 1.

The release mechanism 68 positioned at an upper end of the stand 10 near the first support 12 can be adjusted to alter the overall height of the stand 10 according to the use of the stand 10 and according to the height of the person using the stand 10. The first and second pins 70 and 72 are squeezed together to release the release mechanism 68 allowing the first support 12 to move.

When the stand 10 is to be closed, the legs 20 can be slid back through the holes 62 of the retainer 60 and into a closed, more compact position. The sliding member 22 is moved or slid toward the stop 46 allowing the legs 20 to pivot and be positioned substantially parallel with the second support 14. The retainer 60 is now positioned farther away from the sliding member 22, as illustrated in FIG. 2.

An advantage of the stand 10 is that the stand 10 can be expanded during use and collapsed during non-use, storage and/or transportation. In a closed position, the legs 20 are collapsible and can be positioned alongside the second support 14 for providing for more compact storage. Additionally, the sliding member 22 and legs 20 are repositioned along the second support 14 thereby reducing the overall length of the stand 10.

Another advantage of the stand 10 is that the use of the release mechanisms enables the height and overall length of the stand 10 to be adjusted according to use or non-use. Additionally, the release mechanism enables a person to use one hand to adjust the height or to open and/or close the stand.

Also, an advantage is that the release mechanism enables the sliding member to be positioned in any desired location along the support. Other stands require a positive positioning of the legs, such as a clip that engages with a hole or clasp. However, the release mechanisms 66 and 68 do not need to be positioned in a specific location. The design of the release mechanism 66 allows the sliding member and, therefore, the legs to be positioned anywhere along the support. This design enables any number of positions of the legs, and the first and second supports for providing a variety of positions as compared to only a few set positions. Also, the variety of positions enables quick and easy set-up and closure of the stand.

Additionally, the use of the retainer 60 provides a stable base assembly, and in conjunction with the release mechanisms provides a stand 10 that can be easily and quickly folded or expanded. Also, the retainer 60 guides the movement of the plurality of legs and retains positioning of the legs in both the open and closed positions of the stand.

The slot shaped holes in the retainer allow for easy movement of the legs therethrough. Since the retainer holes 62 are spaced substantially equidistantly and radially from each other, the legs are positioned in a stable position with respect to one another for supporting the stand.

Thus there has been shown and described a novel stand for supporting an object which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A stand for supporting an object, comprising:
   a support attachable to the object;
   a sliding member having a first end, a second end, and an elongated portion extending therebetween, the elongated portion having at least one slot positioned between the first end and the second end, the sliding member positioned unattached and slidably coupled to the support for enabling the sliding member to slide along the support;
   a plurality of legs coupled to one of the first and second ends of the sliding member for allowing the plurality of legs to move with the sliding member when the sliding member slides along the support, and the plurality of legs positionable on a ground surface; and
   a release mechanism positioned unattached and within the at least one slot of the sliding member and positioned unattached and disposed about the support for slidably coupling the release mechanism to the support and slidably coupling the release mechanism to the sliding member, the release mechanism positioned movable with the sliding member along the support for controlling movement of the sliding member to move the plurality of legs into an outward expanded position during use of the stand and to move the plurality of legs into an inward collapsed positioned during non-use of the stand, manipulation of the release mechanism alters frictional contact of the release mechanism about the support and with the sliding member allowing movement of the sliding member along the support and frictional engagement of the release mechanism with the sliding member and with the support at any desired position along the support for enabling positioning of the sliding member and the plurality of legs into any desired position along the support.

2. The stand according to claim 1, further comprising a retainer coupled to the support, the retainer having a plurality of holes for insertion of the plurality of legs therethrough.

3. The stand according to claim 2, further comprising:
   the retainer having a threaded hole; and
   the support having a threaded portion mateably engagable with the threaded hole of the retainer for securing together the retainer and the support.

4. The stand according to claim 1, wherein the support includes a first support and a second support telescopically attached together, the sliding member secured to the second support, and the object attachable to the first support, the second support having a bore for disposition of the first support therein.

5. The stand according to claim 1, further comprising a stop secured to the support for limiting movement of the sliding member.

6. The stand according to claim 1, wherein coupling of the plurality of legs to the sliding member includes:
   at least one bracket attached to the sliding member and having the at least one bracket attached to each of the plurality of legs; and
   at least one pivot pin having at least one of the at least one pivot pin positioned within each of the at least one bracket and having at least one of the at least one pivot pin attached to each of the plurality of legs for allowing each leg to pivot about one pivot pin.

7. The stand according to claim 2, wherein the plurality of holes of the retainer are elongated slots for allowing the plurality of legs to angularly slide therethrough.

8. The stand according to claim 1, wherein the release mechanism comprises:
the sliding member having a bore for disposition of the support;
at least one release pin positioned within the bore of the sliding member and having an aperture therethrough, the support slidable within the aperture of the release pin during movement of the sliding member and the support, the at least one release pin positioned at an angle within the sliding member and the support during a resting position of the at least one release pin so that the at least one release pin exerts force onto the at least one support for preventing the support from moving within the sliding member; and
a spring disposed within the bore of the sliding member and positioned adjacent to the at least one release pin, manipulation of the at least one release pin enables slidable movement of the support through the spring and through the aperture of the at least one release pin for adjusting positioning of the plurality of legs.

9. The stand according to claim 4, further comprising:
a second release mechanism attached to the second support for controlling movement of the first and second supports;
the second release mechanism including at least one release pin positioned within the bore of the second support and having an aperture therethrough, the first support slidable within the aperture of the release pin during telescopic movement of the first and second supports, the at least one release pin positioned at an angle within the first and second supports during a resting position of the at least one release pin so that the at least one release pin exerts force onto the first support for preventing the first support from moving within the second support; and
the second release mechanism including a spring disposed within the bore of the second support and positioned adjacent to the at least one release pin, manipulation of the at least one release pin enables slidable movement of the first support through the spring and through the aperture of the at least one release pin for adjusting positioning of the object.

10. The stand according to claim 8, further comprising:
the sliding member having at least one hole and at least one slot; and
the at least one release pin having a protuberance engagable with the at least one hole and a grip extension extending through the at least one slot for enabling a person to grasp the grip extension for manipulation of the at least one release pin for controlling movement of the sliding member and the at least one support.

11. The stand according to claim 8, wherein the at least one release pin includes a first release pin and a second release pin, the spring positioned between the first and second release pins for controlling movement of the sliding member in an upward and a downward direction.

12. A stand for supporting an object, comprising:
a support attachable to the object, the support being an elongated member for positioning the object in spaced apart relationship to a ground surface;
a sliding member having a first end and a second end and a bore therebetween forming an elongated tubular portion having at least one slot therein, the support disposable within the bore of the sliding member for movably and unattachably coupling the sliding member to the support;
a retainer secured to the support and having a plurality of slot shaped holes therethrough;
a plurality of legs coupled to the sliding member and disposed through the plurality of slot shaped holes of the retainer, the plurality of legs slidable through the plurality of slot shaped holes for controlling movement of the plurality of legs into an outward expanded position during use of the stand and into an inward collapsed positioned during non-use of the stand; and
a release mechanism positioned unattached and within the at least one slot of the sliding member and positioned unattached and disposed about the support for slidably coupling the release mechanism to the support and slidably coupling the release mechanism to the sliding member, the release mechanism positioned movable with the sliding member along the support for controlling movement of the sliding member to move the plurality of legs into an outward expanded position during use of the stand and to move the plurality of legs into an inward collapsed positioned during non-use of the stand, manipulation of the release mechanism alters frictional contact of the release mechanism about the support and with the sliding member allowing movement of the sliding member along the support and frictional engagement of the release mechanism with the sliding member and with the support at any desired position along the support for enabling positioning of the sliding member and the plurality of legs into any desired position along the support.

13. The stand according to claim 12, further comprising:
the support including a first support and a second support telescopically attached together; and
a release mechanism attached to the second support for controlling movement of the first and second supports with respect to one another.

14. The stand according to claim 12, further comprising a stop secured to the support for limiting movement of the sliding member in a direction away from the retainer.

15. The stand according to claim 12, wherein the plurality of legs are pivotally coupled to the sliding member.

16. The stand according to claim 12, wherein the release mechanism comprises:
at least one release pin positioned within the bore of the sliding member and having an aperture therethrough, the support slidable within the aperture of the release pin during movement of the sliding member and the support, the at least one release pin positioned at an angle within the sliding member and the support during a resting position of the at least one release pin so that the at least one release pin exerts force onto the support for preventing the support from moving within the sliding member; and
a spring disposed within the bore of the sliding member and positioned adjacent to the at least one release pin, manipulation of the at least one release pin enables slidable movement of the support through the spring and through the aperture of the at least one release pin for adjusting positioning of the plurality of legs.

17. A stand for supporting an object, comprising:
a first support attachable to the object;
a second support having a first end and a second end, the first end telescopically attached to the first support;
a sliding member having a first end, a second end, and an elongated portion extending therebetween, the elongated portion having at least one slot, the sliding member positioned unattached and movably coupled to the second end of the second support;

a retainer secured to the second end of the second support and having a plurality of holes therethrough;

a plurality of legs coupled to the sliding member and insertable through the plurality of holes of the retainer, the plurality of legs slidable within the plurality of holes of the retainer as the sliding member moves toward and away from the retainer; and a release mechanism positioned unattached and within the at least one slot of the sliding member and positioned unattached and disposed about the support for slidably coupling the release mechanism to the support and slidably coupling the release mechanism to the sliding member, the release mechanism positioned movable with the sliding member along the support for controlling movement of the sliding member to move the plurality of legs into an outward expanded position during use of the stand and to move the plurality of legs into an inward collapsed positioned during non-use of the stand, manipulation of the release mechanism alters frictional contact of the release mechanism about the support and with the sliding member allowing movement of the sliding member along the support and frictional engagement of the release mechanism with the sliding member and with the support at any desired position along the support for enabling positioning of the sliding member and the plurality of legs into any desired position along the support.

18. The stand according to claim 17, wherein the plurality of holes are slot shaped and are positioned substantially equidistantly from each other.

19. The stand according to claim 17, wherein coupling of the plurality of legs to the sliding member includes:
- at least one bracket attached to the sliding member and having at least one of the at least one bracket attached to each of the plurality of legs; and
- at least one pivot pin having at least one of the at least one pivot pin positioned within each of the at least one bracket and having at least one of the at least one pivot pin attached to each of the plurality of legs for allowing each leg to pivot about one pivot pin.

* * * * *